United States Patent [19]

Chang et al.

[11] Patent Number: 4,818,984
[45] Date of Patent: Apr. 4, 1989

[54] BROADCASTING MESSAGES IN A DISTRIBUTED PROCESSING SYSTEM

[75] Inventors: Shih-Jeh Chang, Naperville; Richard T. Emery, Montgomery; Shafik J. Hakim, Naperville; Jen-Lie Ho, Naperville; Paul E. Janssen, Naperville; Carol M. McCullagh, Lisle, all of Ill.

[73] Assignee: American Telephone and Telegraph Company, AT&T Bell Laboratories, Murray Hill, N.J.

[21] Appl. No.: 935,402

[22] Filed: Nov. 26, 1986

[51] Int. Cl.$^4$ .................. H04Q 11/04; H04Q 5/02; H04J 3/16
[52] U.S. Cl. .................. 340/825.54; 340/825.52; 370/85; 370/94
[58] Field of Search ........... 340/825.5, 825.52, 825.05, 340/825.08, 825.54, 825.55; 370/85, 86, 90, 94; 371/32, 33

[56] References Cited

U.S. PATENT DOCUMENTS

| | | | |
|---|---|---|---|
| 4,281,315 | 7/1981 | Bauer et al. | 340/825.08 |
| 4,430,651 | 2/1984 | Bryant et al. | 340/825.52 |
| 4,445,214 | 4/1984 | Reynolds et al. | 370/94 |
| 4,520,477 | 5/1985 | Wen | 370/58 |
| 4,554,659 | 11/1985 | Blood et al. | 370/88 |
| 4,568,930 | 2/1986 | Livingston et al. | 340/825.5 |
| 4,574,284 | 3/1986 | Feldman et al. | 340/825.52 |
| 4,595,921 | 6/1986 | Wang et al. | 340/825.08 |
| 4,628,504 | 12/1986 | Brown | 370/85 |
| 4,707,694 | 11/1987 | Bauer et al. | 340/825.54 X |

OTHER PUBLICATIONS

AT&T Technical Journal; "5ESS TM Switch"; vol. 64, No. 6, part 2, pp. 1305-1564, Jul.-Aug. 1985.
G. Gopal et al., "Delay Analysis of Broadcast Routing in Packet-Switching Networks", IEEE Transactions on Computers, vol. C-30, No. 12, Dec. 1981, pp. 915-922.
J. M. McQuillan, "A Review of the Development and Performance of the Arpanet Routing Algorithm", IEEE Transactions on Communications, vol. COM-26, No. 12, Dec. 1978, pp. 1802-1811.

Primary Examiner—Robert L. Griffin
Assistant Examiner—Ralph E. Smith
Attorney, Agent, or Firm—Werner Ulrich

[57] ABSTRACT

A method and apparatus for transmitting messages from one processor to a plurality of other processors in a distributed processing system having no hardware message broadcast facilities. The transmitting processor includes a broadcast program process for controlling the transmission of any messages destined for a plurality of other processors. Different client processes in the transmitting processor request the broadcast process to transmit a broadcast message. The single broadcast process controls the number of individual messages which are sent out sequentially to each of the receiving processors in such a way as to ensure that the broadcast messages do not interfere with other message traffic that frequently has tighter delivery time requirements. The broadcast process transmits the broadcast messages to each of the plurality of recipient processors without waiting for acknowledgment response messages from any of these processors. The broadcast process collects received acknowledgment response messages and informs the client process of the summarized response results.

16 Claims, 4 Drawing Sheets

BROADCAST MESSAGE TRANSMISSION

BROADCASTING MESSAGES IN A DISTRIBUTED PROCESSING SYSTEM

TECHNICAL FIELD

This invention deals with apparatus and methods for transmitting data messages in a distributed data processing system, and more specifically, for transmitting such messages from one processor to a plurality of processors in a system.

PROBLEM

In distributed data processing systems, identical messages must sometimes be sent from one processor to a plurality of, or all, other processors. Such messages are hereinafter called broadcast messages. In some systems, there is no broadcast hardware so that a broadcast message must be sent as a series of individual messages. In such systems, broadcast messages are usually transmitted at a lower priority than messages which need to be transmitted within tight timing tolerances, since the broadcast messages might otherwise tie up transmission resources for a long period. Because several independent program processes may be trying to transmit broadcast messages simultaneously, and in order to avoid tying up the transmission resources, such messages are sent one at a time from each transmitting process, in each case awaiting an acknowledgment message before proceeding. As a result, the time required for broadcasting a message to a large number of such processors is excessively long.

SOLUTION

The above problem is solved and an advance is made over the prior art by controlling a processor by a program to transmit broadcast messages sequentially to a plurality of processors, advantageously independent in time from the receipt of acknowledgment responses. Illustratively, messages from any of a plurality of client processes in a transmitting processor are transmitted under the control of a single broadcast message process. The broadcast process then also collects acknowledgments and responses to the message to ensure that all processors have received and acknowledged each message. The arrangement further provides a throttle, controlled by the broadcast process, for such broadcast messages by variably limiting the rate at which such messages can be transmitted according to the level of total message traffic, thus advantageously minimizing the delivery time for broadcast messages without tying up the message communication system for an excessive length of time during periods of heavy message traffic.

DETAILED DESCRIPTION

Figure 1:
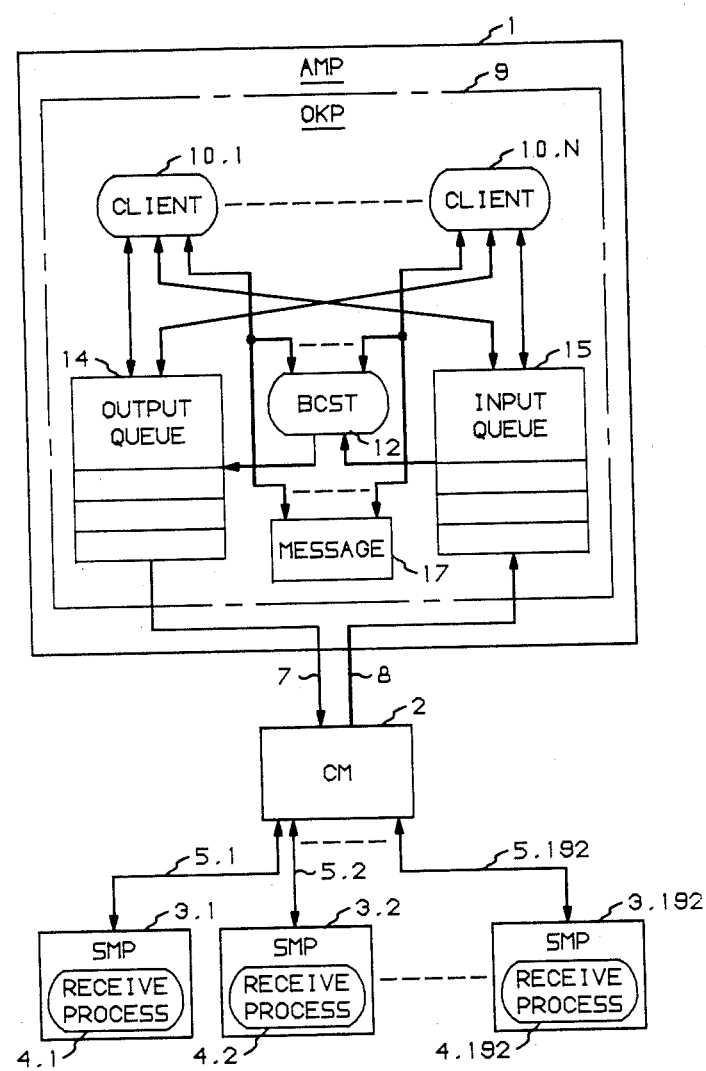
FIG. 1 is a block diagram of the hardware and software of a distributed processing system illustrating the present invention.

FIG. 1 is a block diagram of an exemplary embodiment of the invention. FIG. 1 shows module processors of a 5ESS ® switch, manufactured by AT&T Technologies, Inc., and described in *AT&T Technical Journal*, Vol. 64, No. 6, Part 2, pp. 1305–1564, July-August, 1985. Administrative module processor 1 is used to perform functions common to many individual switching module processors. Communications module 2 is used for switching data messages between administrative module processor 1 and the various switching module processors 3.1, ..., 3.192 and for switching data messages among these switching module processors. Switching module processors 3.1, 3.2, ..., 3.192 are processors for individual switching modules (not shown) for connection to lines and trunks and for establishing voice connections between the communications module and a line or trunk connected to the switching module. The switching module processors 3.1, 3.2, ..., 3.192 communicate data messages via data channels 5.1, 5.2, ..., 5.192, respectively, interconnecting the switching module processors with the communication module 2. In addition, data channel 7 is used for communicating data messages from administrative module processor 1 to communication module 2 and data channel 8 is used for communicating data messages from communication module 2 to administrative module processor 1.

Shown inside administrative module processor 1 is an operational kernel process 9 (OKP) which includes a number of client processes 10.1, ..., 10.N, a broadcast process 12, and an input queue 14 and output queue 15. The client processes generate messages some of which must be sent to several or all switching module processors. The term broadcast message as used herein refers to a message destined for several or all processors of a distributed processing system. Such messages are processed in accordance with the principles of this invention by the common broadcast process 12. Broadcast process 12 receives a broadcast message from one of the client processes 10.1, ..., 10.N and generates individual messages for each destination switching module processor. Broadcast process 12 loads such individual messages in output queue 14, and unloads individual response messages from switching module processors from input queue 15. Messages are assembled and passed between processes in a processor in an area of memory such as message block 17. The input and output queues both communicate with the broadcast process 12 and the individual client processes 10.1, ..., 10.N. Messages are sent between a client process and the queues when that client process communicates with a single switching module processor, and are sent between the queues and the broadcast process when messages are destined for several or all switching module processors. Communications between the queues of the administrative processor and similar queues (not shown) of the switching module processor, and the communications module, are under the control of a message processing program (not shown) that is part of the operating system (not shown) of the administrative module processor and the switching module processors. Such operating systems are well known in the prior art; one such system is described in Grzelawkowski et al.: DMERT Operating System, *Bell System Technical Journal*, Vol. 62, No. 1, Part 2, January 1983, pp. 303–322. The switching module processors 3.1, ..., 3.192 also execute program processes such as 4.1, ..., 4.192 shown in FIG. 1. Ultimately, messages are sent among client processes such as 10.1, ..., 10.N and switching module processes such as 4.1, ..., 4.192.

Figure 2:
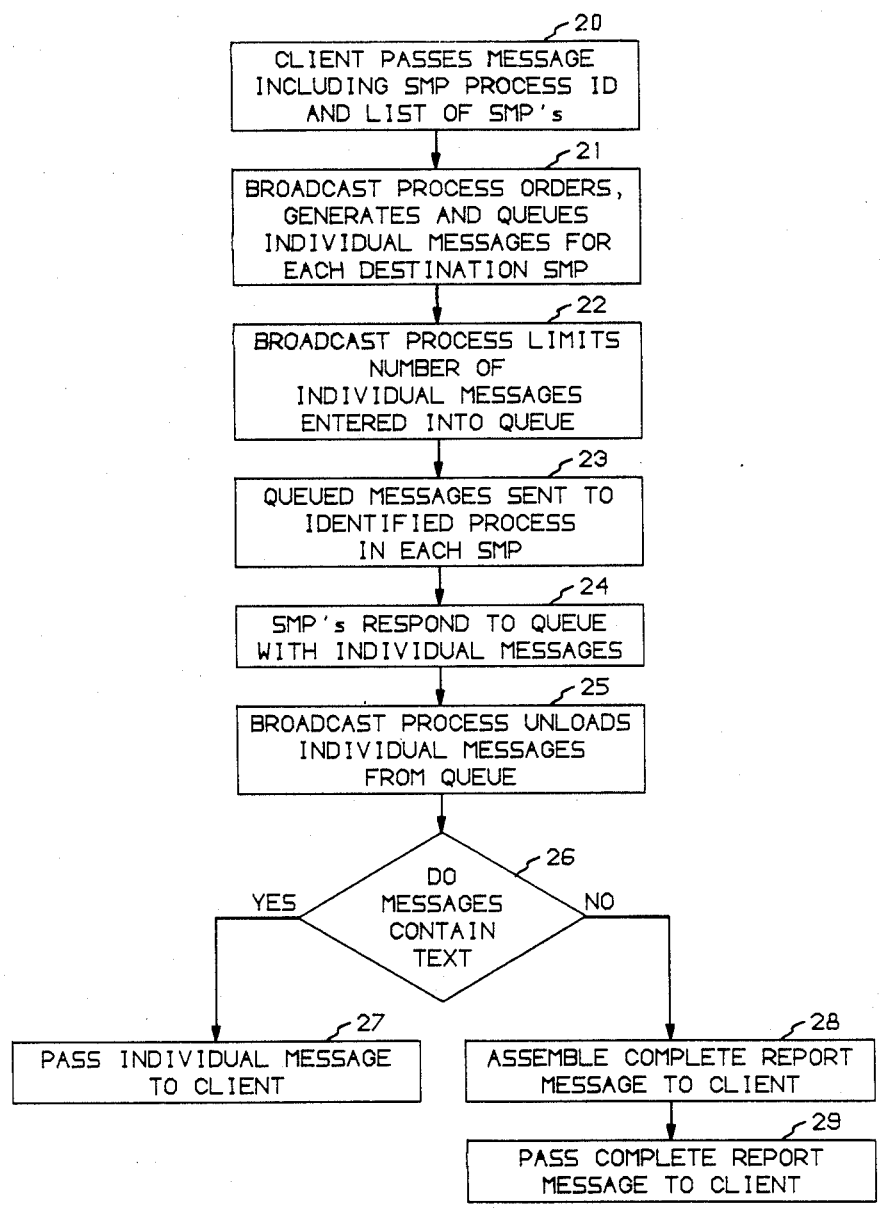
FIGS. 2 and 4 are flow diagrams of the process of sending a broadcast message.
Figure 3:
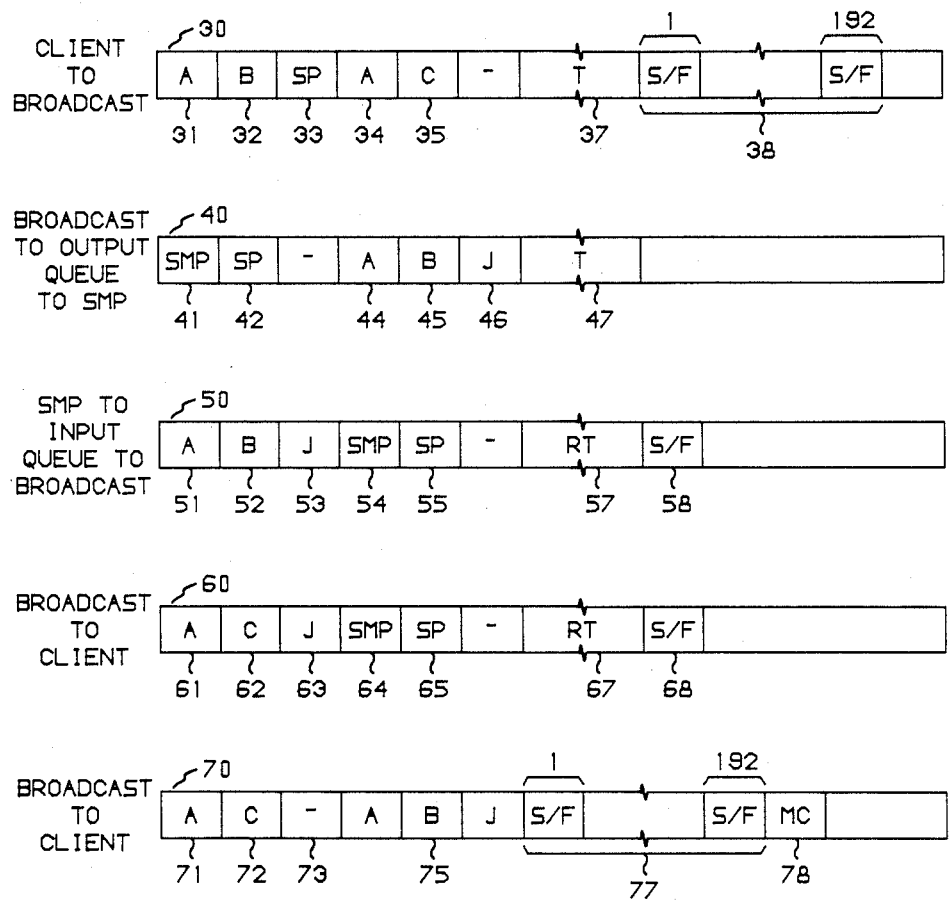
FIG. 3 shows the layout of a group of messages transmitted among processes and processors in accordance with the invention.

FIG. 2 is a flow diagram of the method executed by client, broadcast, and switching module processes in handling a broadcast message. The contents of the message are shown in FIG. 3 and described hereinafter. Block 20 indicates that a client process passes a message including the identification of a switching module process that is the receiver of a broadcast message and a list of the switching module processors which are to receive this message. The broadcast message facility is used for sending messages to the corresponding process in each of several switching module processors. Each of these corresponding processes has the same process identification.

Block 21 indicates that the broadcast process specifies the order in which the individual messages are to be sent, generates these messages, and loads individual messages for each destination switching module processor is output queue 14. The number of messages loaded into the queue at each opportunity, approximately every hundred milliseconds, but longer under very heavy traffic conditions, is limited (block 22). Block 23 indicates that the queued messages are sent from the output queue under the control of the operating system of the administrative module processor 1 to the communication module 2; they are sent thence to the designated switching module processor and the designated process within that switching module processor.

After a switching module processor receives one of these messages, it responds (action block 24) with an acknowledgment response message which is sent via the communication module 2 and is received in administrative module processor 1 and placed in input queue 15. The messages are reported from the input queue 15 to the broadcast process 12 (action block 25). This reporting is performed at a high priority level in order to process the large number of response messages quickly. In the present example, the interject level of the 5ESS switch is used; this allows a message to be reported whenever there is a break between jobs or between portons of a large job of the administrative module processor 1.

The broadcast process 12 performs a check on the received messages to see if these messages contain text as well as a success/failure indication (decision block 26). Some kinds of messages request only a success or failure response. For example, a message in which data is transmitted to a switching module processor for storage therein, the only response required is that the data has been successfully received and processed. However, if the message requests, for example, a measurement from a switching module processor, then the response message from the switching module processor contains text such as the value of the requested measurement. If the message contains such text then each response message is individually passed to the client process (action box 27). Otherwise, a complete report message is assembled for the client process (action block 28). Such a report message is a summary of the success or failure reports from the module processors which have received the message and are responding. Once the complete report message has been assembled, this message is passed from the broadcast process to the client process (action block 29).

Figure 4:
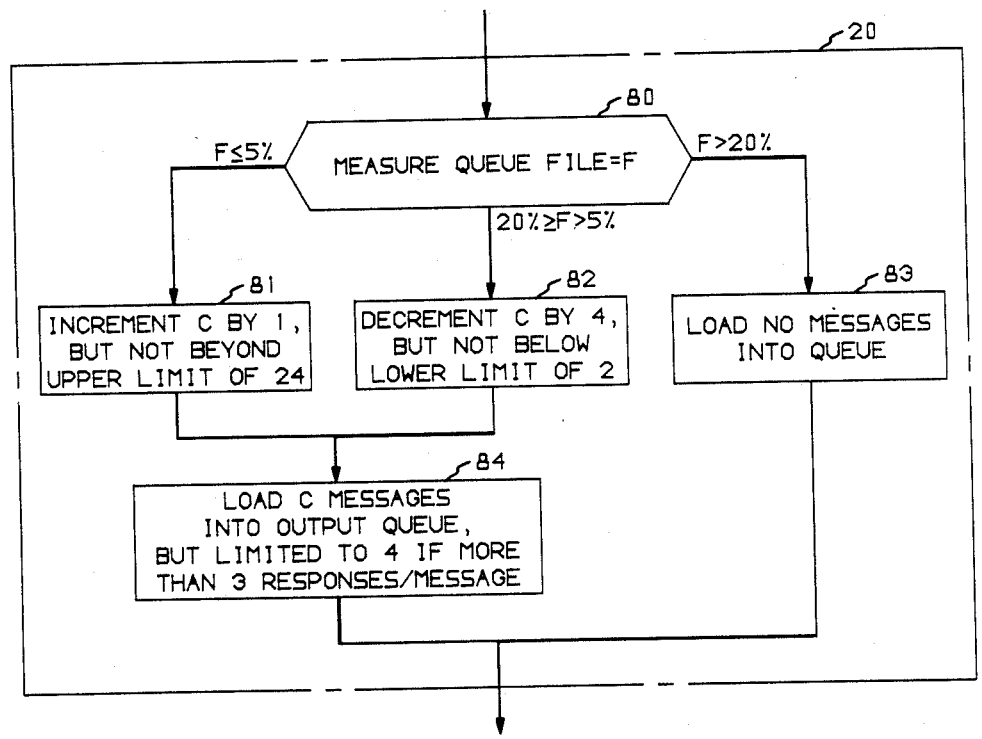

The broadcast process limits the number of individual messages entered into the output queue in order to make sure that broadcast messages do not flood the system to such an extent that other messages, which generally have more stringent delivery time requirements, are excessively delayed. This is illustrated in FIG. 4 which expands block 22 of FIG. 2. The output queue in one embodiment of the 5ESS switch is 8 kilobytes long. The number of individual messages which may be entered into the queue at any one time is limited by a counter C, retained within broadcast process 12. The counter is set to 6 when the system is initialized. Prior to loading messages into output queue 14, the fill of the output queue is measured (block 80). The counter is incremented by 1 up to a limit of 24 each time that the output queue is less than 5 percent full when the broadcast process loads messages into that queue (block 81). The counter is decremented by 4 down to a lower limit of 2 whenever the broadcast process loads messages into the output queue when the output queue is more than 5 percent full (block 82). If the output queue is more than 20 percent full, the broadcast process does not load any messages into the output queue (block 83). The counter then is used as the limit of the number of messages to be loaded into the output queue by the broadcast process; however in order to avoid overloading the input queue with responses to broadcast messages, if the number of responses from each switching module processor to each of the individual messages of the broadcast message exceeds 3; then the number of messages which can be loaded by the broadcast process into the output queue at one time is further limited to 6 unless the counter has a lower value, in which case that lower value is the limit (block 84). It has been found that this method permits relatively rapid transmission of broadcast messages whenever the load of other messages is not too high without interfering with the transmission of such other messages.

The ability of the broadcast process to specify the order in which the messages are queued provides an extra degree of flexibility in the use of communications module resources. For example, the communications module 2 of the 5ESS switch includes message module processors each of which is common to one group of eight switching module processors. The message module processors are arranged so that a first processor is common to switching module processors 1-8, a second processor to switching module processors 9-16, . . . , and a last processor is common to switching module processors 185-192. In the 5ESS switch described herein, equipped with a full complement of 192 switching module processors, the broadcast process 12 would respond to a request to broadcast a message to all 192 switching module processors by first queuing messages to the first member of each group of eight (1,9, . . . , 185), then queuing messages to the second member of each group of eight (2,10, . . . , 186), to be followed eventually by queuing messages to the last member of each group of eight (8,16, . . . , 192). By queuing messages in this order, a series of successive overflows of requests to each of the message module processors in the communications module is avoided and the message load of each of these units is kept at the same level throughout the process of transmitting the broadcast message. While this particular ordering is especially appropriate for the type of communicatons module found in the 5ESS switch, the flexibility for ordering can be usefully applied in other data switching arrangements having equipment which is common to subsets of receiving processors.

FIG. 3 shows the layout of messages flowing between processes and between module processors. Table 1 is a list of the abbreviations used in FIG. 3.

TABLE I
ABBREVIATIONS FOR FIG. 3

| | |
|---|---|
| A | Administrative Module Processor Identification |
| B | Broadcast Process Identification |
| C | Client Process Identification |
| J | Job Identification |
| MC | Message broadcast complete |
| RT | Return Text from Switching Module Processor |
| S/F | Success/Failure/Send Indication |
| SMP | Switch Module Processor Identification |
| SP | Switching Module Process Identification |
| T | Text to Switching Module Processor |

Each message contains a header specifying the destination and the source of the message. The source and the destination are each specified by three segments, the first indicating the destination processor, the second indicating the destination process within that processor, and the third indicating additional supplementary information when necessary. Block 30 is the layout of the message sent from the client process to the broadcast process within the administrative module processor. The "to" segments comprise the identification 31 of the destination module processor (the administrative module processor), the identification 32 of the destination process (the broadcast process), and as supplementary information, the identification 33 of the ultimate destination of the message, namely the switching module process to which the message is being sent. The "from" segments include the identification 34 of the sending processor (the administrative processor), and the identification 35 of the sending process (the client process). In addition, segment 37 contains any text that is to be sent to each destination switching module processor. Segment 38 contains 1 byte for each switching module processor in the maximum size system (192 modules). These 192 bytes are used initially to specify to the broadcast process which module processors are to receive the message and are subsequently used to signal to the client process which module processors successfully received and processed the message or, in case of a failure, the type of failure experienced by the receiving process.

The broadcast process takes the message 30 and converts it into a series of messages, a typical one of which is shown in the layout of block 40. The three destination segments contain the identification 41 of a specific switching module processor which is to receive the message, the identification 42 of the process within that switching module processor which is the destination of the message. The "from" segments comprise the identification 44 of the sending processor (the administrative processor), the identification 45 of the sending process (the broadcast process), and a job identification 46, specified by the broadcast process to identify all the messages associated with one broadcast. The message to each switching module processor also contains segment 47 which is a copy of the text initially shown in segment 37.

Block 50 shows the layout of the response by one switching module processor to the message received by that processor. The destination segments include the identification 51 of the destination processor (the administrative processor), the identification 52 of the destination process (the broadcast process), and the job identification 53 to permit the broadcast process to associate the response message with the rest of the messages of that broadcast and with the client process. The source segments include the identification 54 of the transmitting switching module processor and the identification 55 of the process within that processor. Segment 57 of block 50 contains any return text generated by the switching module processor in response to the message received by that processor. Segment 58 contains a success or failure indication to notify the broadcast process whether a message had been received and properly processed or if not properly processed the type of failure (queue overflow, for example).

Blocks 60 and 70 illustrate two types of response messages from the broadcast process to the client process. The broadcast process is able to associate responses with a particular client through the mechanism of the job identification. The broadcast to client process response message illustrated in block 60 is a response from a single switching module processor whereas the response message 70 illustrates a summary response message. Block 60 includes the destination segments specifying the identity 61 of the destination processor (the administrative processor), the identification 62 of the destination process (the client process), and the job identification 63 to inform the client process of the particular broadcast message being responded to. The source segments specify the identification 64 of the switching module processor that sent the response message and the identification 65 of the process within that processor. Segment 67 contains the return text, if any, generated by the swtching module processor and has the same contents as segment 57 previously described. Segment 68 contains the success or failure indication returned in segment 58 by the switching module processor.

Block 70 is the layout of a summary response message from the broadcast process to the client process. The destination segments include the identification 71 of the destination processor (the administrative processor), the identification 72 of the destination process (the client process). The source segments specified in block 70 are the identification 74 of the source processor which is the administration processor, the identification 75 of the source process, which is the broadcast process, and the job identification 76 to permit the client process and to associate the response with the appropriate message. Segment 77 contains 1 byte per switching module processor in the largest system and contains all the success or failure bytes assembled from individual response messages from the switching module processors that responded. For those module processors to which no message was transmitted, the original "no send" indication is retained in that byte. For those module processors to which a message was transmitted but from which no response was received, the value of the byte, which was set to the "message sent" indication at the time the message was transmitted is retained. When a response is received, the value of the byte is set to the "success" or "type of failure" indication of segment 58. Thus, the success/failure byte may have any of the following indications: success, no message sent, message sent—no response received, or type of failure indication from the response of a module processor that received the message. Finally, block 70 also contains 1 byte 78 indicating whether the broadcast process was completed, i.e., that messages were sent to all switching module processors for which there was a request and responses were received from all of these processors. This byte may have one of three values: process complete, time out before completion, or process killed before completion. The bytes of segment 77 are retained, for example, in message block 17, where they are initially specified by the client register, altered by the broadcast process as messages are loaded into output queue 14, and further altered as response messages are received by the broadcast process from the switching module processors via the input queue 15.

The client process makes the decision of what further action to take in case all processors have not responded with "success" to the braodcast message. Further possible actions include a limited number of retrials. Alternatively, the broadcast process could autonomously perform one or more retrials within a timeout interval. The use of a single broadcast process permits a throttling of broadcast type messages to ensure that a number of clients acting independently do not flood the message transmission and reception facilities of the administrative module processor if they happen to generate such messages essentially simultaneously. Further, the broadcast process concentrates the program facilities for administering the broadcast messages into a single process. Further, within the broadcast process arrangements can be made, using well known techniques, for ensuring that higher priority broadcast messages are processed before lower priority broadcast messages.

While the above description has shown how messages can be sent from an administrative module processor to a plurality of of other processors, the same principles can be used to send messages among different processors of a distributed processing system. The use of a single broadcast process offers the same advantage of permitting a broadcast message load throttle whether the broadcast process is in an administrative processor or in any other processor of a distributed processing system.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In a distributed processing system comprising a plurality of processors using acknowledgment signal processing of broadcast messages, a method of transmitting broadcast messages from one of said processors to a plurality of other ones of said processors and receiving acknowledgment response from each of said other ones of said processors, comprising the steps of:
   transmitting a broadcast message from said one of said processors to each of said other ones of said processors individually and in sequence without waiting for receipt of acknowledgment responses from any of said other ones of said processors; and
   collecting acknowledgment responses for the transmitted broadcast messages received from each of said other ones of said processors.

2. The method of claim 1, wherein said received acknowledgment responses comprise a failure response from one of said other ones of said processors, said method further comprising the step of:
   retransmitting said broadcast message to said one of said other ones of said processors.

3. In a distributed processing system comprising a plurality of processors using acknowledgment signal processing of broadcast messages, a method of transmitting a broadcast message from one of said processors to a plurality of others of said processors and receiving acknowledgment responses from each of said other ones of said processors, comprising the steps of:
   requesting by a client process of said one processor the transmission of a broadcast message by a message broadcasting process of said one processor;
   under the control of said message broadcasting process, transmitting said broadcast message from said one of said processors to each of said other ones of said processors individually and in sequence without waiting for receipt of acknowledgment responses from any of said other ones of said processors;
   collecting acknowledgment responses for the transmitted broadcast messages received from each of said other ones of said processors by said message broadcasting process; and
   reporting said acknowledgment responses collected by said message broadcasting process to said client process.

4. The method of claim 3 further comprising the steps of:
   concurrently requesting by an additional plurality of client processes the transmission of an additional plurality of broadcast messages by said message broadcasting process; and
   reporting acknowledgment responses for one of said additional plurality of broadcast messages collected by said message broadcasting process to the client process that requested transmission of said one of said additional plurality of broadcast messages.

5. The method of claim 4 wherein said step of transmitting said broadcast message comprises the step of:
   under the control of said message broadcasting process, transmitting one of said additional plurality of braodcast messages from said one of said processors to each of said other ones of said processors individually and in sequence independent of the time of reception of acknowledgment responses to any of said additional plurality of broadcast messages from any of said other ones of said processors.

6. The method of claim 3 further comprising the step of:
   measuring a rate of message traffic flow from said one of said processors; and
   limiting said rate of message traffic flow transmitted under the coantrol of said broadcasting process in response to said measurement of said rate of message traffic flow.

7. In the distributed processing system of claim 6 wherein said one of said processors comprises a message queue for storing messages for transmission, and a counter, the method of claim 6 wherein said step of measuring said rate of message traffic flow comprises the step of measuring the fill of said message queue; and 8. A distributed processing system comprising:
   a plurality of processor means each comprising an associated stored control program;
   one of said processor means operative under the control of its associated control program for executing a client process and a broadcast process wherein execution of said client process generates data for a broadcast message and execution of said broadcast process controls transmission of said broadcast message sequentially to others of said processor means;

each of said others of said processor means operative under the control of its said associated control program for receiving said broadcast message and transmitting an acknowledgment response message to said one of said processor means; and wherein said step of limiting comprises the steps of: modifying the contents of said counter in response to said step of measuring the fill; and limiting the number of messages loaded at one time in the queue by said broadcasting process to the value of said counter.

9. The distributed processing system of claim 8 wherein said one of said processor means comprises an output queue for storing messages for transmission, and wherein said one of said processor means is further operative under the control of its said associated control program for measuring the fill of said output queue and for limiting loading of data of said broadcast message into said output queue in response to said measurement of fill.

10. A processor system for broadcasting a message to a plurality of other processors and for receiving acknowledgment responses from each of said plurality of other processors comprising:

processor means comprising a stored control program;

said processor means operative under the control of said control program for generating and transmitting a broadcast message to each of said plurality of other processors individually and in sequence without waiting for receipt of acknowledgment responses from any of said plurality of other processors and for collecting said acknowledgment responses for said broadcast message received from each of said plurality of other processors.

said one of said processor means further operative under the control of its said associated control program for reporting data of said acknowledgment response messages to said client process;

wherein execution of said broadcast process controls transmission of said broadcast message from said one of said processor means individually and in sequence without waiting for receipt of acknowledgment responses from any of said others of said processor means.

11. In the processor system of claim 10, said processor means further operative under the control of said control program for executing a client process for requesting the transmission of said broadcast message, and for executing a broadcast process for transmitting said broadcast message individually and in sequence to each of said plurality of other processors, for collecting said acknowledgment responses for said broadcast message, and for reporting said acknowledgment responses to said client process.

12. In the processor system of claim 10, wherein said processor means comprises an output queue for storing messages for transmission, said processor means further operative under the control of said control program for measuring the fill of said output queue and for limiting loading of data of said broadcast message into said output queue in response to said measurement of fill.

13. In a distributed processing system comprising a plurality of processors using acknowledgment signal processing of broadcast messages, a method of:

transmitting a broadcast message from one of said processors to each of other ones of said processors individually and in sequence without waiting for receipt of acknowledgment responses from any of said other ones of said processors; and collecting acknowledgment responses for the transmitted broadcast messages received from each of said other ones of said processors without waiting for receipt of acknowledgment responses from any of said other ones of said procssors.

14. The method of claim 13, further comprising the step of:

retransmitting said broadcast message to one of said other ones of said processors in an absence of a receipt of an acknowledgment response therefrom.

15. In a distributed processing system comprising a plurality of processors using acknowledgment signal processing of broadcast messages, a method of:

requesting by a client process of one of said processors the transmission of a broadcast message by a message broadcasting process of said one of said processors;

under the control of said message broadcasting process, transmitting said broadcast message from said one of said processors to each of other ones of said processors individually and in sequence;

collecting acknowledgment responses for the transmitted broadcast messages received from each of said other ones of said processors by said message broadcasting process without waiting for receipt of acknowledgment responses from any of said other ones of said processors; and reporting said acknowledgment responses collected by said message broadcasting process to said client process.

16. The method of claim 15 further comprising the step of:

measuring the message traffic flow from said one of said processors; and limiting said rate of message traffic flow transmitted under the control of said broadcasting process in response to said measurement of said rate of message traffic flow.

* * * * *

UNITED STATES PATENT AND TRADEMARK OFFICE
CERTIFICATE OF CORRECTION

PATENT NO. : 4,818,984

DATED : April 4, 1989

INVENTOR(S) : Shih-Jeh Chang, Richard T. Emery, Shafik J. Hakim, Jen-Lie Ho, Paul E. Janssen, Carol M. McCullagh It is certified that error appears in the above-identified patent and that said Letters Patent is hereby corrected as shown below:

Column 8, claim 5, line 36, delete "braodcast" and substitute --broadcast--.

Column 8, claim 6, line 49, delete "coantrol" and substitute --control--.

Column 8, claim 7, line 57, after "queue; and", insert the following 3 clauses:

--wherein said step of limiting comprises the steps of:

modifying the contents of said counter in response to said step of measuring the fill; and limiting the number of messages loaded at one time in the queue by said broadcasting process to the value of said counter.--

Column 9, claim 8, lines 6-11, delete entire lines 6-11 and substitute

--said one of said processor means further operative under the control of its said associated control program for reporting data of said acknowledgment response messages to said client process;

wherein execution of said broadcast process controls transmission of said broadcast message from said one of said processor means individually and in sequence without waiting for receipt of acknowledgment responses from any of said others of said processor means.--

UNITED STATES PATENT AND TRADEMARK OFFICE
CERTIFICATE OF CORRECTION

PATENT NO. : 4,818,984

DATED : April 4, 1989

INVENTOR(S) : Shih-Jeh Chang, Richard T. Emery, Shafik J. Hakim, Jen-Lie Ho, Paul E. Janssen, Carol M. McCullagh It is certified that error appears in the above-identified patent and that said Letters Patent is hereby corrected as shown below:

Column 9, claim 10, lines 38-47, delete entire lines 38-47.

Column 10, claim 13, line 22, delete "procssors" and substitute

--processors--.

Signed and Sealed this

Fifth Day of June, 1990

Attest:

HARRY F. MANBECK, JR.

*Attesting Officer*    Commissioner of Patents and Trademarks